(12) United States Patent
Takano et al.

(10) Patent No.: US 6,685,126 B2
(45) Date of Patent: Feb. 3, 2004

(54) METHOD OF WINDING ARMATURE OF REVOLVING FIELD ELECTRIC MACHINE AND ARMATURE

(75) Inventors: Tadashi Takano, Shuuchi-gun (JP); Susumu Ando, Shuuchi-gun (JP); Yoshio Kato, Komaki (JP)

(73) Assignee: Kabushiki Kaisha Moric, Shuuchi-gun (JP)

( * ) Notice: Subject to any disclaimer, the term of this patent is extended or adjusted under 35 U.S.C. 154(b) by 0 days.

(21) Appl. No.: 10/064,543

(22) Filed: Jul. 25, 2002

(65) Prior Publication Data

US 2003/0025024 A1 Feb. 6, 2003

(30) Foreign Application Priority Data

Aug. 3, 2001 (JP) ........................................ 2001-235683

(51) Int. Cl.[7] ............................................ H02K 15/085
(52) U.S. Cl. ................. 242/432.2; 242/434.7; 242/444.2; 29/605
(58) Field of Search ............................. 242/432, 432.1, 242/432.2, 432.3, 432.4, 434, 434.7, 434.8, 444.2, 444.5; 29/605

(56) References Cited

U.S. PATENT DOCUMENTS

| 1,036,935 | A | * | 8/1912 | Underhill | 336/206 |
|---|---|---|---|---|---|
| 1,036,937 | A | * | 8/1912 | Underhill | 242/444.4 |
| 1,278,993 | A | * | 9/1918 | Parks | 336/206 |
| 1,836,948 | A | * | 12/1931 | Anderson | 336/185 |
| 1,840,139 | A | * | 1/1932 | Turner | 336/205 |
| 3,995,785 | A | * | 12/1976 | Arick et al. | 242/432.4 |
| 6,100,610 | A | * | 8/2000 | Katagiri et al. | 310/42 |
| 6,108,897 | A | * | 8/2000 | Beakes et al. | 29/596 |
| 6,530,140 | B2 | * | 3/2003 | Maeda et al. | 29/596 |

* cited by examiner

Primary Examiner—Emmanuel M. Marcelo
(74) Attorney, Agent, or Firm—Ernest A Beutler (57) ABSTRACT

Armature structures and methods that provide very dense coil windings and afford very rapid winding methods at a relatively low cost. In addition the likelihood of damaging the already wound wires by contact with the winding nozzle is substantially eliminated. This is achieved by moving the winding needle in varying distances and directions away from the pole teeth to induce varying degrees of slack in the wire during the winding and when the needle is not in the slot between the pole teeth.

12 Claims, 10 Drawing Sheets

METHOD OF WINDING ARMATURE OF REVOLVING FIELD ELECTRIC MACHINE AND ARMATURE

BACKGROUND OF THE INVENTION

This invention relates to a method of winding armatures for revolving-field electrical machines and more particularly to an improved winding method that permits a greater coil density to be obtained and avoids the likelihood of damaging the wire by the winding needle during the winding operation and also to an improved armature construction.

Various methods have been employed for forming the coil windings for the armature of rotating electrical machines such as motors or generators. Generally these winding methods result in somewhat complicated structures and structures wherein the maximum coil densities are not capable of being obtained. Several of these methods involved passing a needle in the slot between the extending cores of the armature and then having that needle circumscribe the individual cores so as to form the windings. Because of the fact that the needle must be passed in the space between the cores, room must be left for it and this decreases the coil density.

In addition, there is a likelihood that the needle may engage already wound coils and damage them particularly by removing their insulation. These various prior art methods are described in full detail in the co-pending application assigned to the Assignee hereof, entitled "Stator Coil Structure For Revolving-Field Electrical Machine and Method Of Manufacturing Same", App. No. 09/683764, filed Feb. 12, 2002.

Although the structure and method shown in that aforenoted co-pending application is very effective in achieving the goals set forth therein, it is believed that further improvements can be made. Thus it is a principle object of the invention to provide an improved winding method that can achieve the results set forth in the aforenoted co-pending application and at the same time the structure of the armature can be simplified and the winding technique improved so as to avoid any possible damages to the coils while being wound and to insure maximum coil density.

It also is a further object of this invention to provide an improved armature construction that provides dense coil windings with protection between the several layers of the individual windings.

SUMMARY OF INVENTION

A first feature of this invention is adapted to be embodied in a method of winding the coils of a rotating electrical machine. In this method, a circular core of magnetic material with a plurality of magnetic pole teeth extending radially from the circular core is provided. Each of the magnetic pole teeth defines a core and slots formed therebetween. Each of the slots defines a mouth that is formed between adjacent outer ends of the cores. The winding method comprises the steps of positioning a threading needle having an opening through which the wire for the winding of the coils is fed into proximity to one of the mouths. The needle opening is moved in a path around one of the pole teeth without moving the needle in any substantial distance into the slot to form a first winding. During the winding of successive coils the needle is moved in a generally circular path of greater length than the final length of the coil winding to provide slack in the length of the wire.

Another feature of the invention is also adapted to be embodied in a method of winding the coils of a rotating electrical machine. In accordance with this method, a circular core of magnetic material with a plurality of magnetic pole teeth extending radially from the circular core is also provided. Each of the magnetic pole teeth defines a core and slots formed therebetween. This winding method comprises the steps of positioning a threading needle having an opening through which the wire for the winding of the coils is fed into proximity to each of the pole teeth and moving the needle in a path around the pole teeth to establish at least a first winding layer around the pole tooth. Then a thin insulating layer is positioned over the at least first winding layer and a further winding layer is placed over the insulating layer.

A further feature of the invention is also adapted to be the coil windings for the armature of a rotating electrical machine. The armature comprises a circular core of magnetic material with a plurality of magnetic pole teeth extending radially from the circular core. Several layers of coil windings are formed on each of the magnetic pole teeth. At least one thin insulating layer is positioned between adjacent of the coil windings.

DETAILED DESCRIPTION

Figure 1:
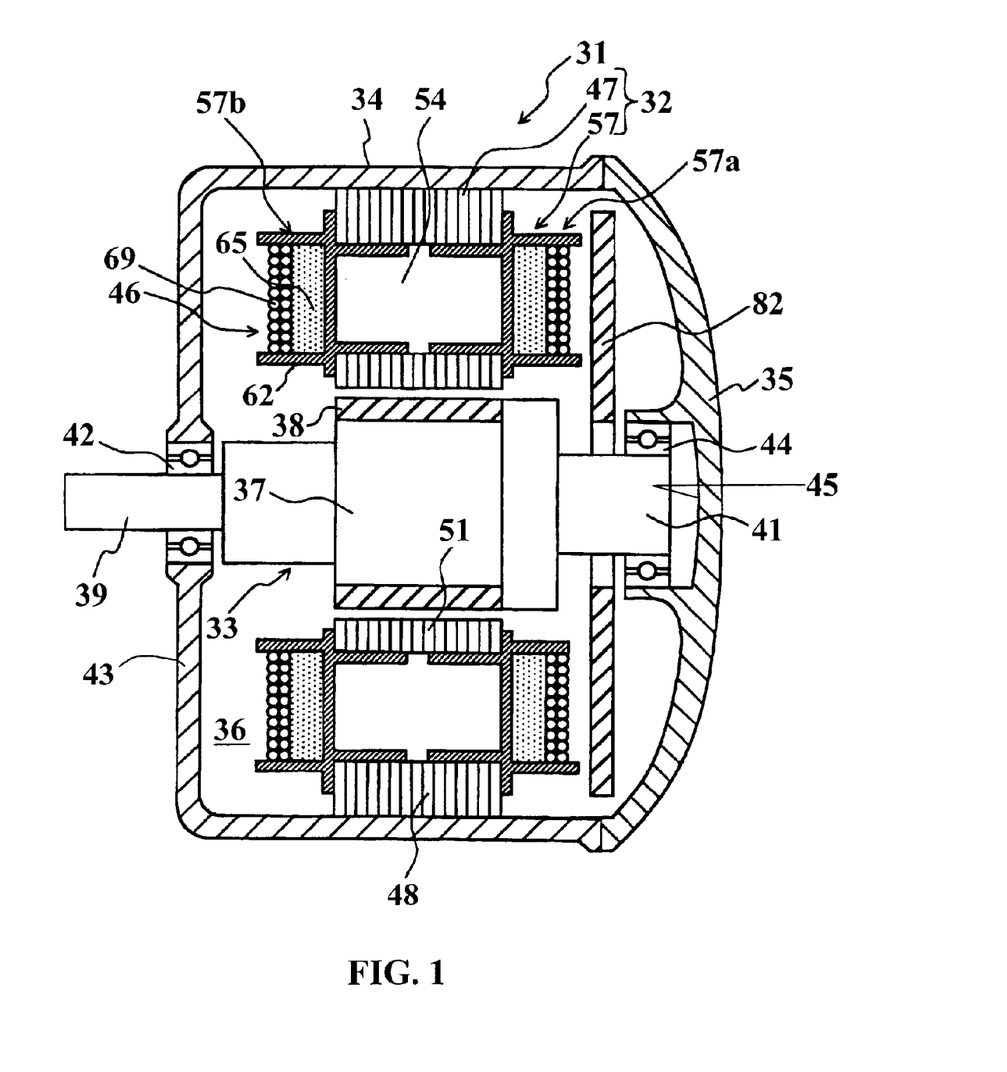
FIG. 1 is a cross sectional view taken through a rotating electrical machine formed in accordance with one embodiment of the invention.

Referring now in detail to the drawings and initially to the construction shown in FIGS. 1 through 16, with primary reference first to FIG. 1, a rotating electric machine constructed in accordance with the invention is identified generally by the reference 31. The rotating electric machine 31 may be either an electric motor or a generator depending upon the desired application.

The rotating electrical machine 31 is comprised of a stator assembly, indicated generally by the reference numeral 32, and a rotor assembly, indicated generally by the reference numeral 33. These components are contained within a housing assembly that is comprised of a cup shaped, main housing piece 34 and a cover plate 35, which is suitably attached thereto to form an enclosure 36 in which the stator assembly 32 and rotor assembly 33 are positioned.

The rotor assembly 33 is formed with a central portion 37 on which a plurality of circumferentially spaced permanent magnets 38 having alternating polarity are affixed in a known manner. The end portions of the rotor assembly 33 comprise shaft portions 39 and 41 that are journalled, respectively, in bearings 42 carried by an integral closure wall 43 of the cup shaped, main housing piece 34 and bearings 44 carried in a recessed portion 45 of the cover plate 35.

The construction of the rotor assembly 33 may be deemed to be of the general conventional type and any type known in this art might be employed. Also, although the described machine employs an arrangement wherein a coil winding assembly, indicated generally by the reference numeral 46 is provided on individual armature poles, to be described, formed on the stator assembly 32, it should be understood that the coil winding assembly 46 can be mounted on the rotor assembly 33 and the permanent magnets 38 may be mounted as part of the stator assembly including the cup shaped, main housing piece 34.

Figure 2:
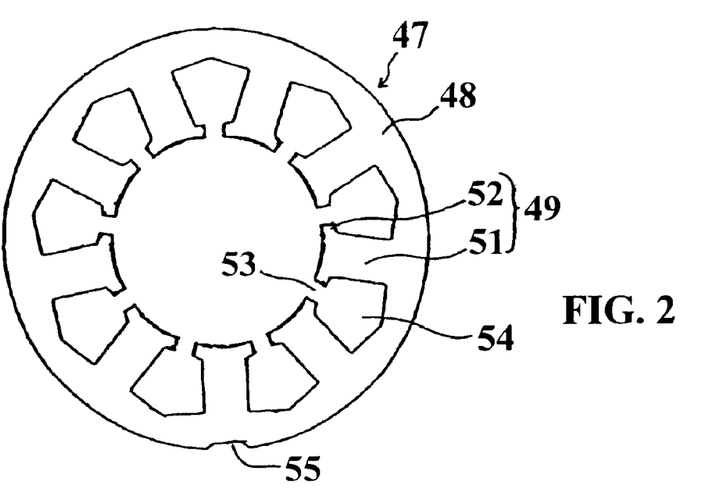
FIG. 2 is an end elevational view of the laminations of the magnetic core looking from one side.
Figure 3:
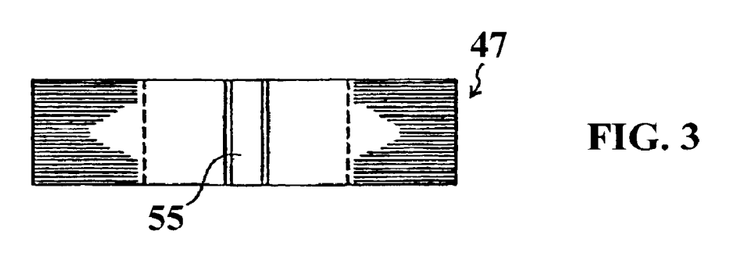
FIG. 3 is a side elevational view of the core.
Figure 4:
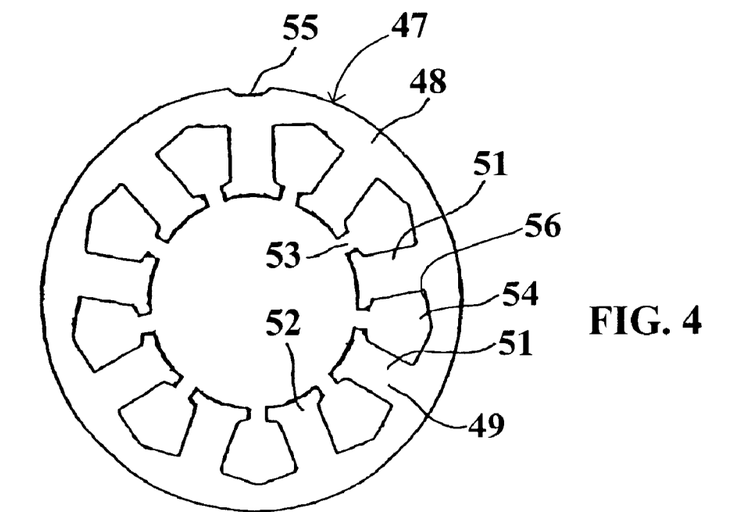
FIG. 4 is end elevational view of the core looking in the opposite direction from FIG. 2.

The stator assembly 32 is comprised of an armature core, indicated generally by the reference numeral 47, which is made up of a plurality of laminated armature plates as shown in FIGS. 2 through 4. In this embodiment, since the armature core 47 is the outer element of the rotating electric machine 31, it is comprised of a circular core portion 48 from which a plurality of pole teeth, each indicated generally by the reference numeral 49, extend. The pole teeth 49 have generally rectangular portions 51 that extend outwardly from the circular core portion 48 and which terminate in enlarged, projecting ends 52. Gaps 53 are formed between adjacent ends of these projecting ends 52, which form the outer termination of slots 54, formed between adjacent pole teeth 49.

In order to assist in the alignment of the lamination of the core pieces of the armature core 47, each of them is formed with a reference slot 55 on the outer periphery of their circular portion 48. This slot 55 assists in alignment as well as location within the cup shaped, main housing piece 34.

The ends of the slots 54 adjacent the circular portion 48 of the armature core 47 is defined by angularly disposed surfaces 56 formed on opposite sides of the bases of each of the pole teeth 49. These act as projections that cooperate with the projecting ends 52 at the outer ends of the teeth 49 so as to assist in locate an insulating bobbin forming members 57 around which the coil winding assembly 46 is formed as well as locating the individual windings themselves.

The insulating bobbin forming members 57 are comprised of right and left hand sections 57a and 57b, which have a substantially identical construction, except as will be hereinafter described. Like the armature core 47, the insulating bobbin forming member 57 is comprised of a circular portion 58 that has an L-shaped cross section and from which extend individual legs 59 of a generally U-shape which is complimentary to and snuggly received on the core pole teeth 49. Inclined surfaces 60 at the base of these legs 59 cooperate with the aforenoted angularly disposed surfaces 56 formed at the outer ends of the pole teeth 49 so as to provide a stop or abutment against which the coil windings actually engage. This construction also facilitates alignment.

Figure 5:
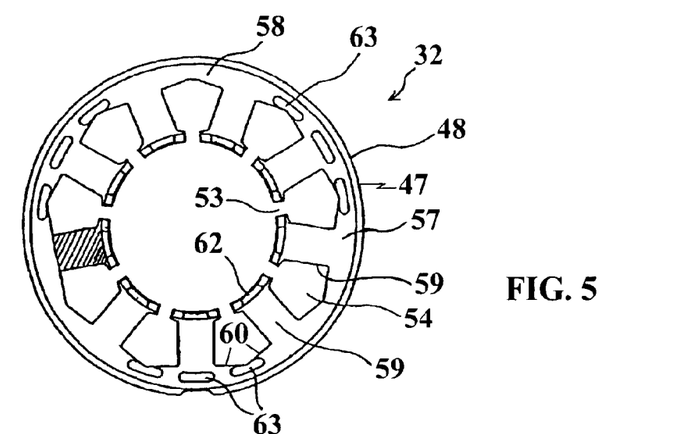
FIG. 5 is an end elevational view, in part similar to FIG. 2, but shows the construction with the insulator in place with one portion of the insulator shaded to show how the side of the insulator is configured to assist in the winding operation.
Figure 6:
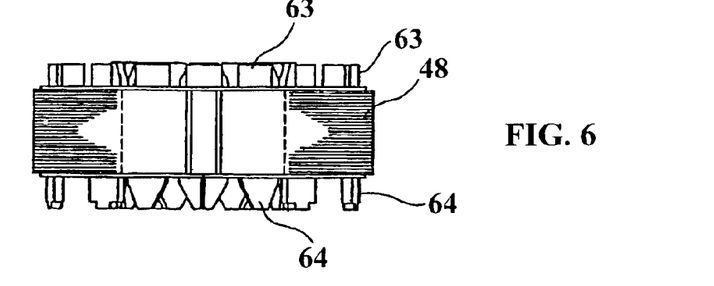
FIG. 6 is a side elevational view, in part similar to FIG. 3, but shows the core assembly with the insulator in place.
Figure 7:
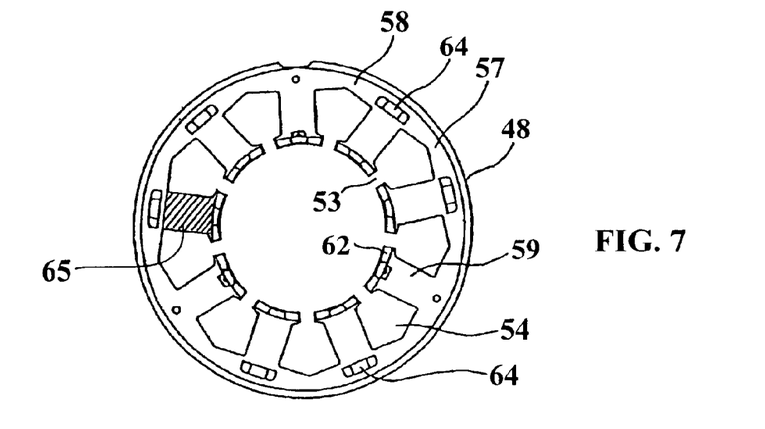
FIG. 7 is an end elevational view, in part similar to FIG. 4 looking in the opposite direction from FIG. 5 and showing one portion of the insulator shaded to show how the side of the insulator is tapered.
Figure 8:
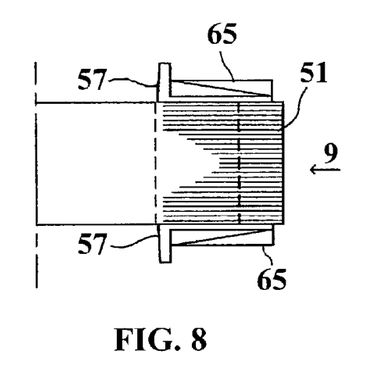
FIG. 8 is a cross sectional view of one of the poll teeth of this embodiment with the coil winding removed.
Figure 9:
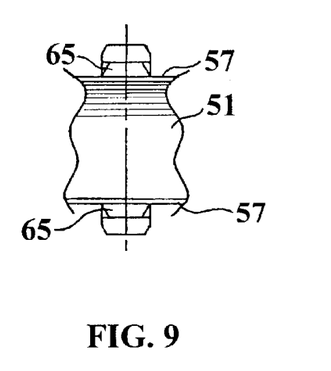
FIG. 9 is a partial end elevational view taken in the direction of the arrow 9 in FIG. 8.
Figure 10:
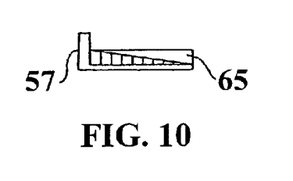
FIG. 10 is a cross sectional view of the upper bobbin half taken along the same plane as FIG. 8.
Figure 11:
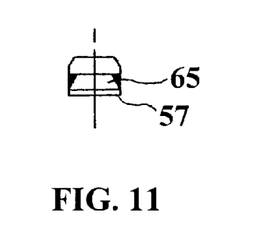
FIG. 11 is an end elevational view looking in same direction as FIG. 9.

As may be seen in FIGS. 5 through 7, the outer periphery of the circular portion 58 of the insulating bobbin forming member 57 extends to a lesser circumferential extent than the outer periphery of the circular portion 48 of the armature core 47.

Projections, indicated at 63, are formed at circumferentially spaced locations around the periphery of the insulating bobbin forming member 57, at least one of which is aligned with the insulator leg portion 59 and another of which is positioned adjacent the intersection between the inclined surfaces 60 as best shown in FIG. 5. This construction is formed at one side of the insulator on one of the insulating bobbin forming member 57a or 57b. The spacing of these projections is chosen in order to facilitate the passage of wires connecting the individual coils of the coil winding assembly 46. On the other side, there are similar further projections, indicated at 64, which may form a similar purpose.

Special insulator inserts indicated by the reference numeral 65 are placed on the faces of the insulator legs 59 on one or preferably both of the insulators in the area between the respective arcuate portions 62 and further projections 63 and 64 thereon. These insulators are shown in lines in FIGS. 5 and 7 so as to indicate their relationship to the respective insulating bobbin forming member 57a or 57b.

The shape of these insulator inserts 65 is chosen so that they act as circumference changing devices for a purpose that will be described now by reference to FIGS. 8–12.

A circumference changing member 65 according to the invention is used in place of the before-mentioned taper members 65. The circumference changing member 65 may be a separate member from the insulating bobbin forming members 57 or a member molded integrally therewith.

Figure 12:
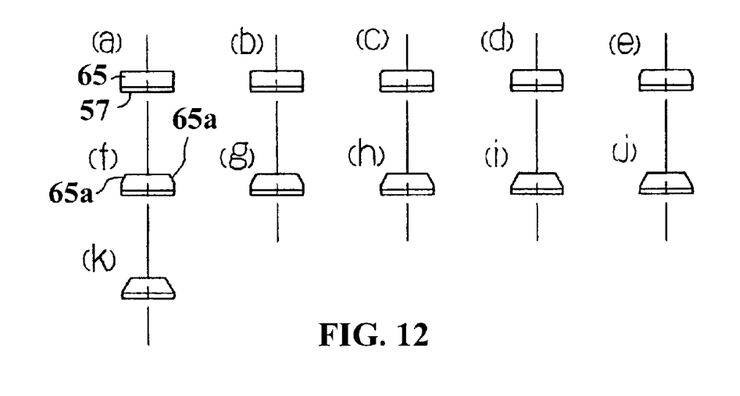
FIGS. 12a–12k are a series of cross sectional views taken at equal intervals along the length of FIG. 8 starting at the base of the pole tooth (left hand side) and ending at the tip (right hand side) thereof.
Figure 13:
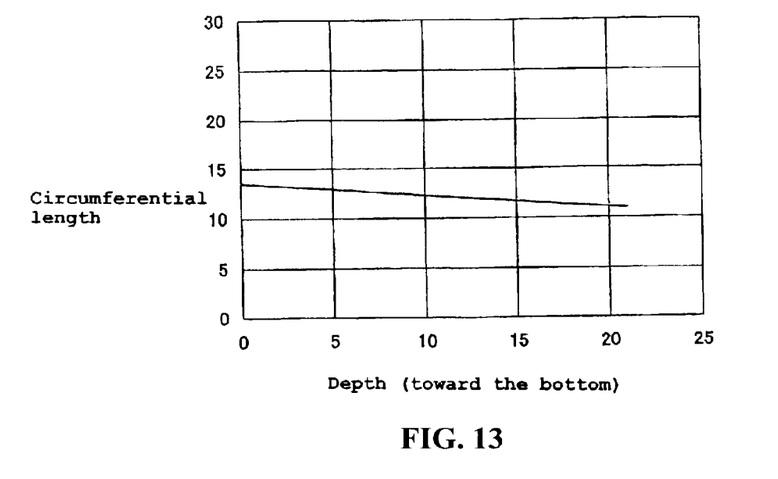
FIG. 13 is a graphical view showing how the configuration of the circumference changing member affects the winding circumference.

As shown best in FIG. 12, the circumference changing member 65 is chamfered as indicated at 65a at its opposite ends on the upper surface wherein the amount of this chamfering is gradually increasing from the positions of (a) through (k) toward the outer periphery. This gradually shortens the surface length of the circumference changing member 65 and accordingly the length or circumference around which each turn of the coil winding 46 makes progressing toward the tips of the pole teeth 51. This change in circumference is depicted graphically in FIG. 13.

Gradually shortening the circumference in such manner allows a drawing support point of the winding that is drawn out of the needle to be disposed on the outer periphery side and allows the winding to easily slide outward when the winding is wound around the inner periphery side. Therefore, the needle winding action outside of the slot 54 (out of the inner periphery side in this example) or adjacent the inlet of the slot 54 without inserting the needle into the slot 54 allows the winding to be wound on the magnetic pole tooth 51 to the bottom side of the slot 54. In this case, as to the needle winding action, it is desirable to increase the length of the loop to the extent of providing slack in the winding in order to carry out the winding action.

Thus, the drawing support point of the winding drawn out of the needle is located at the bottom of the slot to provide slack in the winding for the needle's winding action, which enables the winding to smoothly slide down to form the coil 46 on the magnetic pole tooth 51 while keeping the height of the circumference changing member 65 constant.

However the upper surface of the circumference changing member 65 may be inclined downwardly toward the bottom side as with the before-mentioned taper members 65. Forming such an inclined surface also enables the winding to slide down to the bottom side as described before. However, forming such an inclined surface makes the height of the circumference changing member on the inlet side of the slot greater, resulting in a large protrusion of the coil ends, and therefore, a greater profile thereof in the radial direction, as aforenoted. With respect to this, keeping the height constant as in the example shown in FIGS. 8–12 enables to obtain a stator with a compact profile.

It should be noted that the further projections 63 and 64 need not be formed at the base of each of the pole teeth 49 because of the inclined surfaces 60 formed thereat which will tend to preclude the wire from slipping down along the incline below that point. However, the further projections 63 form a further purpose than stopping the wire coils from slipping down beyond this point as will become apparent.

Figure 14:
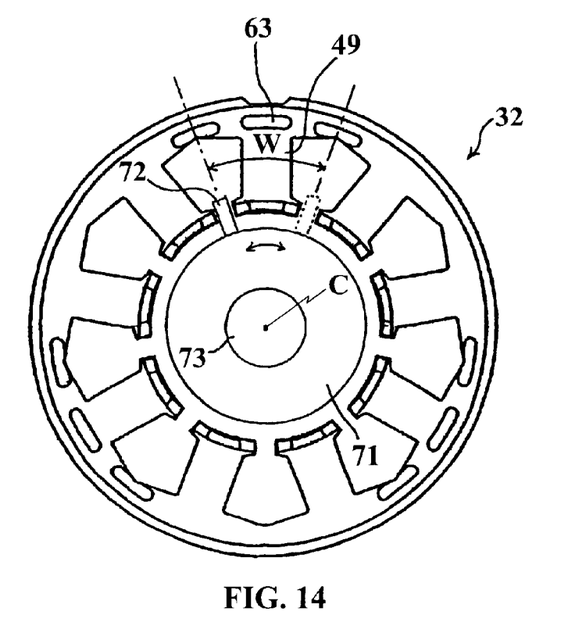
FIG. 14 is a view, in part similar to FIG. 5, and shows how the winding needle is associated with the slots between the pole teeth during the winding operation.

The method by which the winding is accomplished may be best understood and will now be described by reference primarily to FIGS. 14 through 16. The winding apparatus includes a needle carrier 71 that carries a winding needle 72 having a suitable configuration. The needle carrier 71 and needle 72 are formed with a wire guide opening 73 through which the individual enameled wire strand 69 passes from a feed roll 74. The path of wire travel is indicated by the arrows R in FIG. 16.

Figure 16:
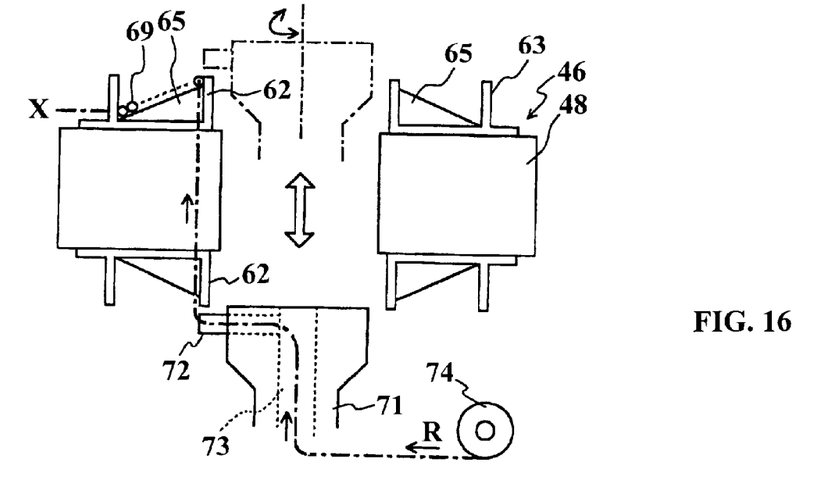
FIG. 16 is a side view looking in a direction perpendicular to FIG. 15 and showing the same paths of travel of the winding needle.

Initially, one end of the wire is clamped by a clamp at the position shown at X in FIG. 16, this being disposed radially outwardly beyond the end of the armature core 47 to form one end of one of the coil windings of the coil winding assembly 46. The needle is then moved radially along the tooth but in an area, which is disposed preferably slightly inwardly of the slots 54 between the teeth and on one axial side thereof as will be described in more detail later by reference to FIGS. 17–20. In this way, when the windings are formed, the bulging portion that overlies the wire end will not fill the slots 54 but will be positioned in an axial direction outwardly from these gaps and along one side face of the individual pole teeth 49.

Figure 15:
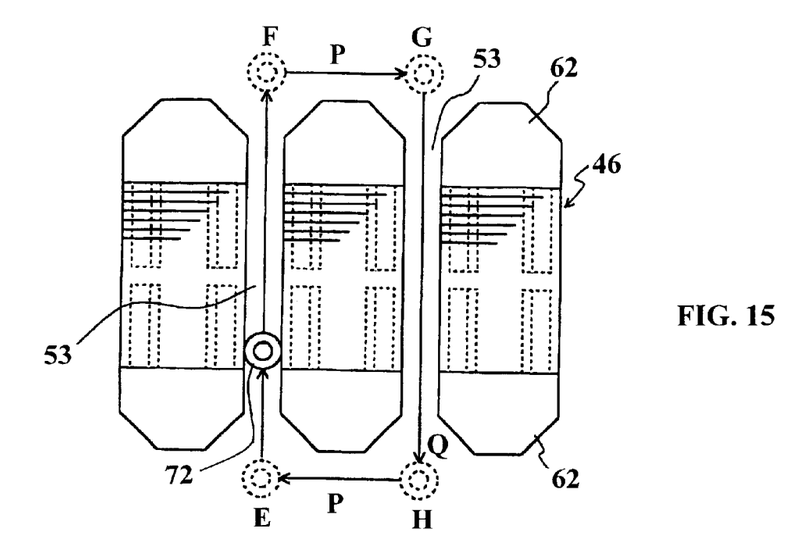
FIG. 15 is a projected side elevational view showing the path the needle takes when winding one of the coil.

The needle carrier 71 generally moves in a rectangular pattern around the individual pole teeth 49 and their overlying insulating bobbin forming members 57 through the path E, F, G and H as seen in FIG. 15. The winding needle 72 also rotates, as shown by the arrow in FIG. 14, through an arc W as it encircles the individual pole tooth 49. During winding, the needle 72 can either be radially positioned in the area immediately inside of the slot 54 in the area formed in the gaps 53 between the projecting ends 52 at the ends of the pole teeth 49, or radially inwardly of this area as long as during the winding operation the wire will contact the inner edge of the arcuate portion 62 of the insulating bobbin forming member 57. In no event, however, will the needle 72 enter deeply into the slot 54 and will always be positioned adjacent the gaps 53.

As the wire is wound, it will be trapped by these edges and will engage the axially outermost portion of the insulator insert 65. Thus, as the needle traverses the path shown by the arrows P in FIG. 15, the wire strands 69 will be engaged with the axial outermost portions of the insulator insert 65. After traversing this area, then the needle 72 and needle carrier 71 is moved in the area indicated by the arrows Q in the radial direction between the adjacent pole teeth 49 and specifically the area of the slots 54.

As each winding is completed, the next winding will engage the previous winding and force it down the incline of the insulator insert 65 so that the wires will collect at the radial outer periphery of the slots 54. There the wire will be restrained by the inclined surfaces 60 of the insulating bobbin forming members 57.

Then, the next series of windings is made and is provided a very neat winding without bulges and which occupies substantially one half at the gap between the pole teeth 49 in the slots 54. This provides a very dense coil and insures maximum output of the machine.

In this case, the winding is drawn out of the tip of the needle 72 to the extent of providing slack in the winding to allow the trail movement of the loop of the tip of the needle 72 to be greater than the length of the coil turn. The drawing support point X of the winding is fixedly located at a point further outside than the bottom side end of the slot 54, thus to provide slack in the winding for its winding action, so that the winding is displaced in the direction of the drawing support point X through a lassoing action while the coil is wound on the magnetic pole tooth 51.

In this case, the needle is displaced such that the amount of slack becomes smaller continuously or in stages turn-by-turn to allow the winding to be sequentially wound toward the inside of the magnetic pole tooth 51 in order to allow the coil to be wound around the magnetic pole tooth from its root side.

Thus, the following methods to provide slack in the winding are employed; (1) A method to increase displacement in the vertical direction parallel to the axis of rotation of the machine. This axis is indicated at "C".

(2) A method to increase displacement in the lateral direction (rotational direction).

(3) A method in which the needle is displaced in a radial direction between the positions where the needle is located outside of the opening face of the slot (See E, F, G or H in the FIG. 15), and a method to combine these methods as appropriate.

Although only one needle carrier 71 and needle 72 is illustrated, preferably several can be provided at circumferentially spaced locations to speed up the winding process. For example there can be provided three of such assemblies, one for each winding phase. They can all be winding at the same time.

Figure 17:
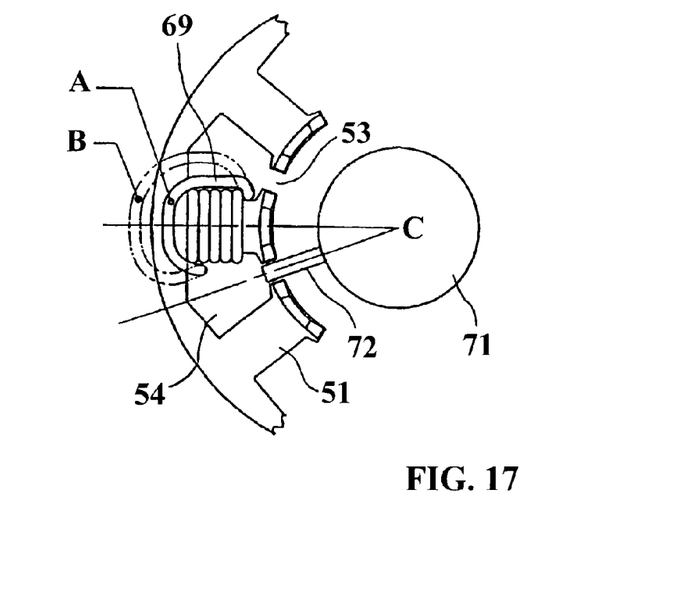
FIG. 17 is a partial side elevational view showing the path of the winding needle and how the slack is induced by moving the needle in a direction parallel to the axis of rotation of the machine.
Figure 18:
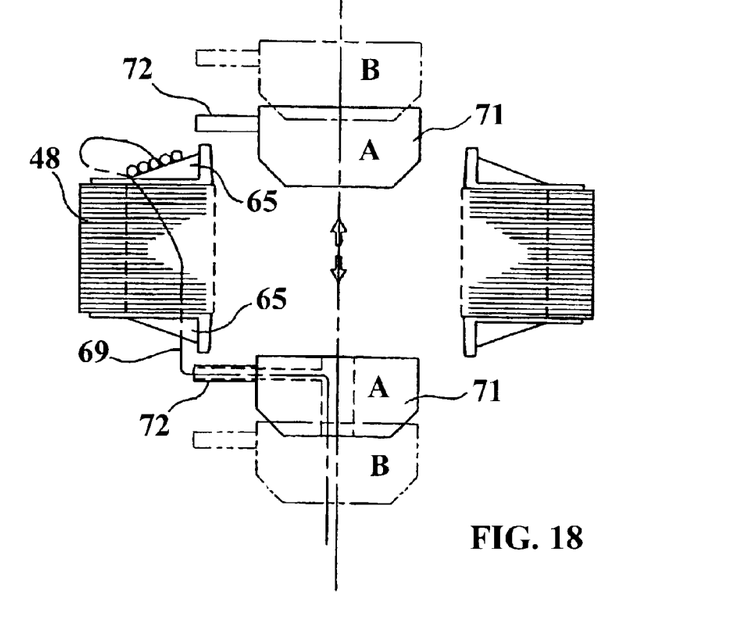
FIG. 18 is a side elevational view of the structure shown in FIG. 17, showing the slack inducing movement of the needle.

The methods by which the varying amount of slack are introduced will now be described by reference to FIGS. 17 to 20 and first by reference to the embodiment of FIGS. 17 and 18. This is the method indicated as (1) above. As illustrated, by changing the vertical strokes between the positions indicated at "A" and "B", the slack can be provided in the winding and the amount of the slack can be changed by altering the distance between these points. In this case, the needle 72 may be moved upward or downward beyond the points E, F, G and H in FIG. 15 to expand the entire rectangular trajectory of the needle vertically, or may be moved beyond the point E, F, G or H, returned to the original position and then moved along the same rectangular trajectory.

Figure 19:
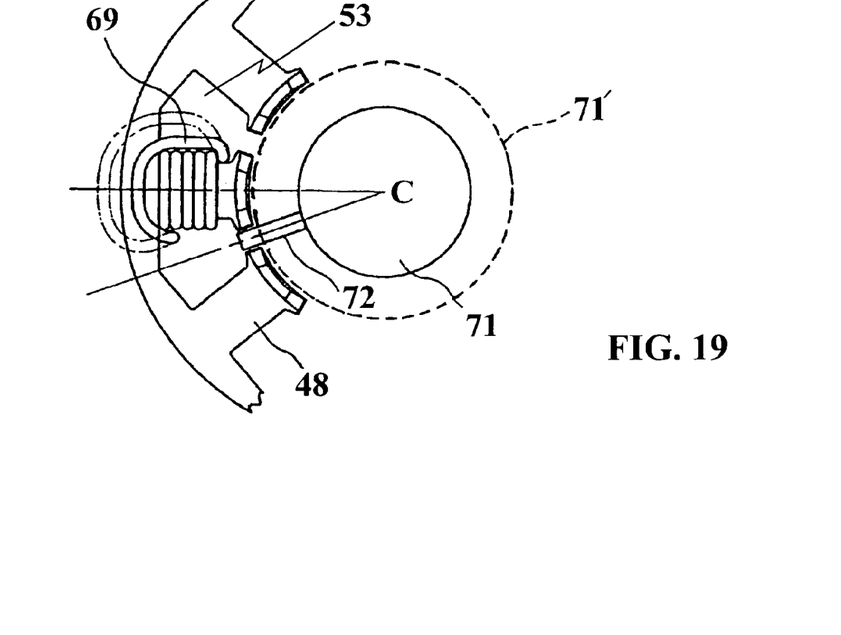
FIG. 19 is a partial side elevational view, in part similar to FIG. 17, showing how the slack is introduced by moving the winding needle in another direction.
Figure 20:
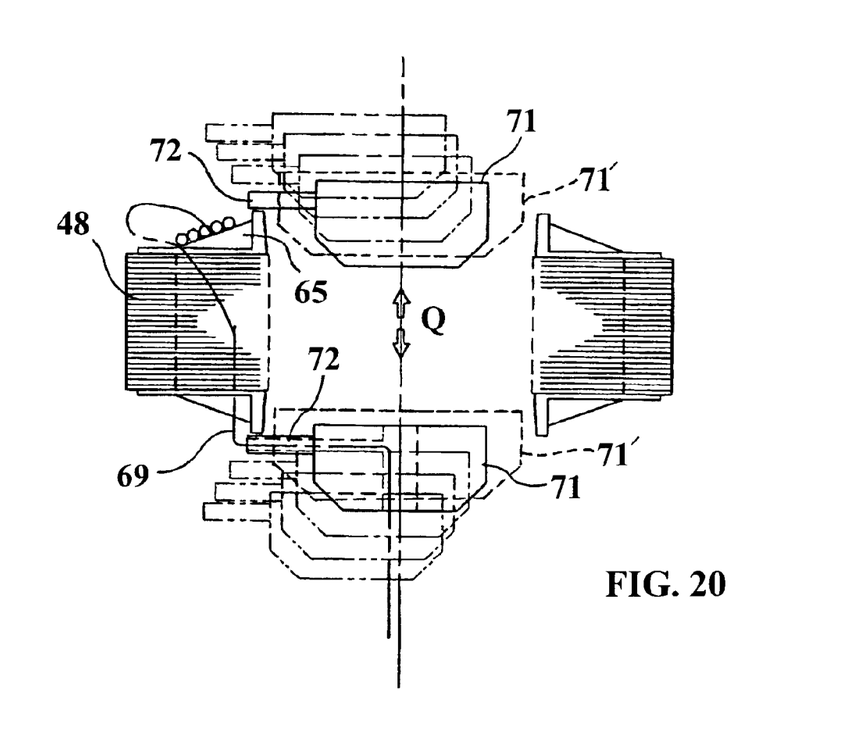
FIG. 20 is a top plan view, in part similar to FIG. 18, but shows the needle displacement in the axial and radial directions.

The method of providing the slack in the winding by stroking the needle back and forth as set forth in (3) above is illustrated in FIGS. 19 and 20. As illustrated, when the needle 72 is at a position outside the upper or lower surface of the stator core 48 (position E, F, G or H in FIG. 15), the needle 72 is moved to the area above the slot 53 (to the left in FIGS. 19 and 20). If the head 71 has an outside diameter which is almost the same as the inside diameter of the stator core 48 (broken lines 71" in FIGS. 19 and 20), it is possible to provide the slack in the winding by moving the needle 72 back and forth when the needle 72 is at its lowermost position (positions E and H in FIG. 15).

When the outside diameter of the head 71 is almost the same as the inside diameter of the stator core 48 (broken lines 71' in FIGS. 19 and 20) only needle 72 may be moved back and forth when the needle is at its uppermost or lowermost position (positions E, F, G and H in FIG. 15) without moving the head 71". This is done in the case the needle 72 is moveable radially relative to the head 71'.

To perform the method (2) noted above, the strokes are extended by moving the needle 72 laterally. That is the needle is moved largely to the right or left to extend the upper side FG and/or lower side EH of the rectangular trajectory shown in FIG. 15, returned to the original position and then moved in the vertical or axial direction (EF and/or GH).

After the desired of the winding methods have been performed utilizing any of the aforedescribed winding methods, a controller assembly of any desired type 82 (FIG. 1) is mounted on the further projections 64 of the insulating bobbin forming member 57A.

Figure 21:
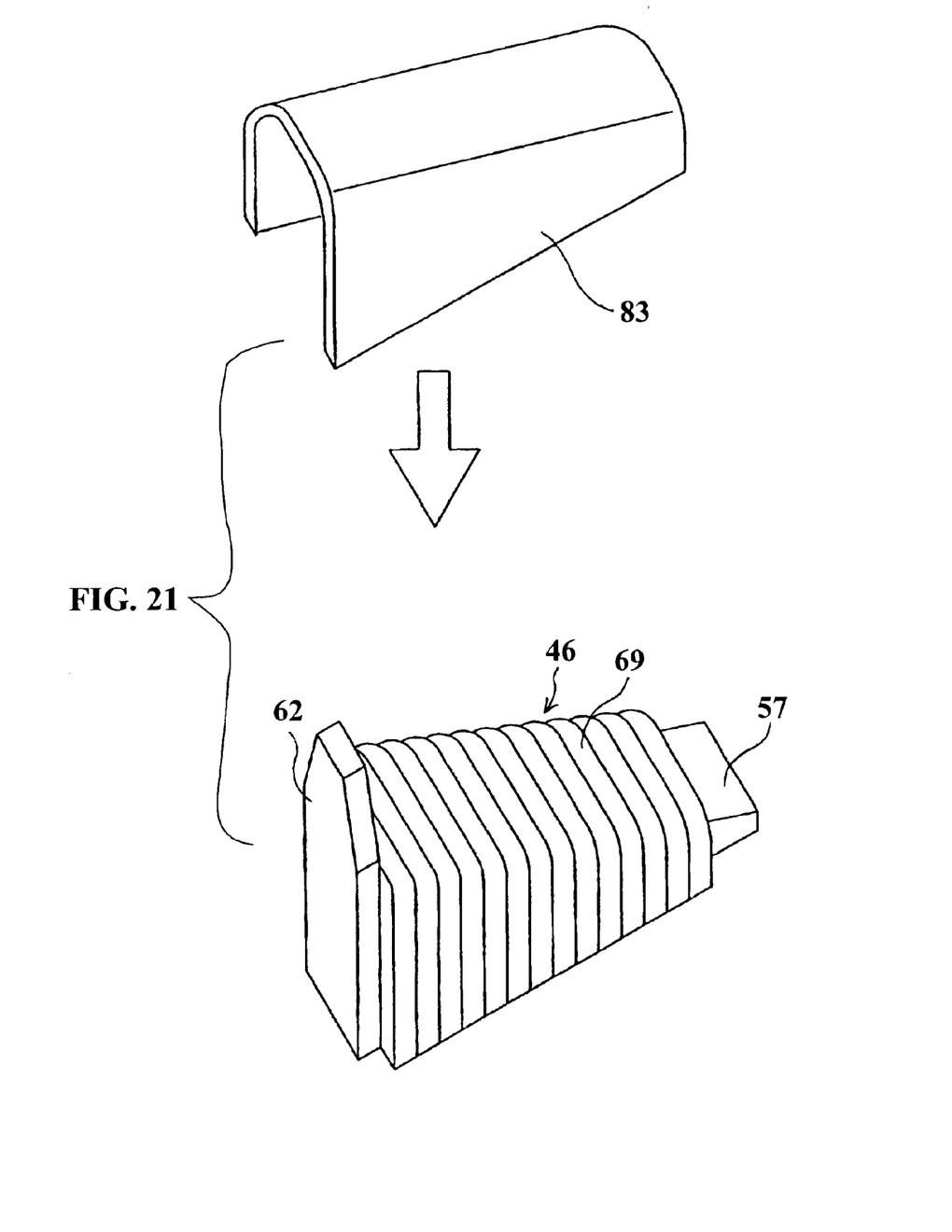
FIG. 21 is an exploded view showing a winding assist insert in accordance with an embodiment of the invention.

FIG. 21 is an exploded perspective view of another feature of the present invention that can be utilized with any of the winding methods described and with any of the insulating winding assisting inserts 65. After the winding 69 has been wound on the insert 65 to form a first layer of the coil 46 as described above, an insulating sliding cover 83 having smooth surfaces is placed over the first layer of the coil 46. The sliding cover 83 may be shaped such that the peripheral length is gradually changed with its height held constant as in the case with the peripheral length changing member 65 or may have an inclined upper surface (the illustrated example has an inclined upper surface). By providing such a sliding cover 83, the winding for the second layer of the coil 46 slides down on the winding of the first layer smoothly and is wound in an aligned manner thereon. This also further protects the insulation on the wire 69 from damage. The number and placements of the sliding covers on each pole tooth 51 can be chosen as desired.

Figure 22:
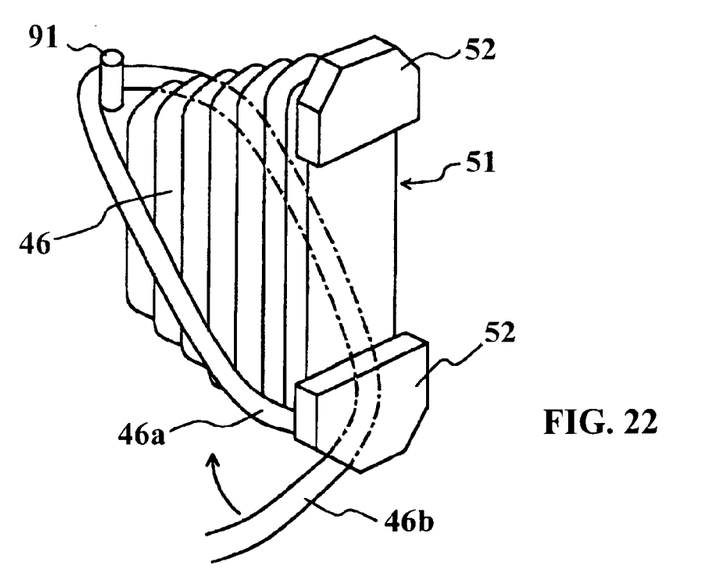
FIG. 22 is a partially schematic perspective view showing another winding method for assisting in slack introduction.
Figure 23:
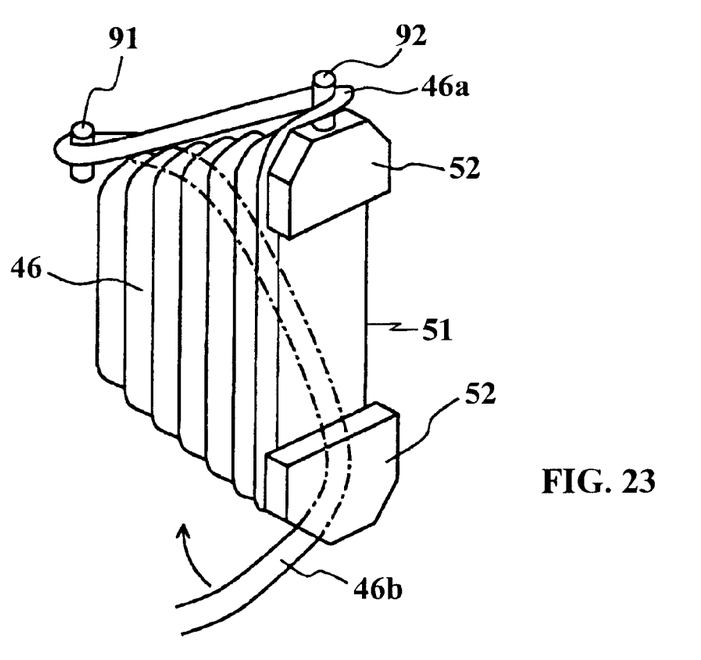
FIG. 23 is a view, in part similar to FIG. 22, and shows yet another winding method assist in accordance with the invention.

FIGS. 22 and 23 show added embodiments of the invention to assist in the winding that can be used with the already described embodiments. Referring first to FIG. 22, a protrusion 91 is provided on the outer periphery 58 of the bobbin 57 (see FIGS. 5–7) on the root side of each of the magnetic pole teeth 51 (see FIGS. 2–4). As illustrated, after the winding 46 has been wound on the magnetic pole tooth 51 to form the first layer of the coil, a winding ending part 46a of the first layer of the coil is pulled to the root side of the magnetic pole tooth 51 (the winding starting part of the winding 46 has sequentially been slid on the inclined surface and moved to the root side of the magnetic pole tooth) and hooked on the protrusion 91. Then, the winding is returned to the end side of the magnetic pole tooth and wound thereon as a winding starting part 46b of the second layer of the coil. Thereby, in winding the second layer of the coil 46, the winding is pulled to the base side of the magnetic pole tooth and slid on the first layer of the coil.

FIG. 23 has a construction similar to FIG. 22 and includes a protrusion 92 on the flange 52 on the end side of each of the magnetic pole teeth 51 in addition to the projection 91 on the base side thereof. In this example, the winding ending part 46a of the winding is hooked on the protrusion 92 on the flange 52, from a coil end part of the first layer of the coil, then hooked on the protrusion 91 on the base side and returned to the end side again. Then, the winding is wound as the winding starting part 46b of the second layer.

As with the embodiment of FIG. 22, that part of the winding which crosses on a side of the first layer of the coil (that part of the coil which passes through a slot 54) obliquely is eliminated, so that the coil can be wound tightly in an aligned manner. The winding starting part 46b of second layer may be hooked on the protrusion 92 again before winding the second layer. Thereby, since that part of the winding which crosses obliquely on the other side of the coil can also be eliminated, the winding in the slots can be wound more neatly, so that there can be formed a tightly wound coil.

Thus, from the foregoing description, it should be readily apparent that the described structures and methods provide very dense coil windings and afford very rapid winding methods at a relatively low cost as compared to the prior art constructions and methods. In addition the likelihood of damaging the already wound wires by contact with the winding nozzle is substantially eliminated. Of course, the foregoing description is that of preferred embodiments of the invention and various changes and modifications in addition to those mentioned may be made without departing from the spirit and scope of the invention, as defined by the appended claims.

What is claimed is:

1. A method of winding the coils of a rotating electrical machine comprising the steps of providing a circular core of magnetic material with a plurality of magnetic pole teeth extending radially from the circular core, each of the magnetic pole teeth defining a core and slots formed therebetween, each of the slots defining a mouth formed between adjacent outer ends of the cores, positioning a threading needle having an opening through which the wire for the winding of the coils is fed into proximity to one of the mouths, moving the needle opening in a path around one of the pole teeth without moving the needle in any substantial distance into the slot to form a first winding, moving the needle during the winding of successive coils in a generally circular path of greater length than the final length of the coil winding to provide slack in the length of the wire.

2. A method of winding the coils of a rotating electrical machine as set forth in claim 1 wherein the slack is introduced by moving the needle in varying directions away from the tooth.

3. A method of winding the coils of a rotating electrical machine as set forth in claim 2 wherein the needle is moved at a time when the needle is not in the slot.

4. A method of winding the coils of a rotating electrical machine as set forth in claim 2 wherein the needle is moved in varying radial directions.

5. A method of winding the coils of a rotating electrical machine as set forth in claim 4 wherein the needle is moved at a time when the needle is not in the slot.

6. A method of winding the coils of a rotating electrical machine as set forth in claim 5 wherein the needle is also moved in another direction relative to the tooth.

7. A method of winding the coils of a rotating electrical machine as set forth in claim 2 wherein the needle in is moved in varying directions parallel to the axis of rotation of the machine.

8. A method of winding the coils of a rotating electrical machine as set forth in claim 7 wherein the needle is moved in directions along the length of the tooth.

9. A method of winding the coils of a rotating electrical machine as set forth in claim 8 wherein the needle is also moved in another direction relative to the tooth.

10. A method of winding the coils of a rotating electrical machine as set forth in claim 1 further including the step of placing a thin layer of insulating material over a complete winding of one tooth before another winding is formed on the tooth.

11. A method of winding the coils of a rotating electrical machine comprising steps of providing a circular core of magnetic material with a plurality of magnetic pole teeth extending radially from the circular core, each of the magnetic pole teeth defining a core and slots formed therebetween, positioning a threading needle having an opening through which the wire for the winding of the coils is fed into proximity to each of the pole teeth and moving the needle in a path around the pole teeth to establish at least a first winding layer around the pole tooth, positioning a thin insulating layer over the at least first winding layer and winding a further coil layer over the insulating layer.

12. An armature for a rotating electrical machine comprising a circular core of magnetic material with a plurality of magnetic pole teeth extending radially from said circular core, several layers of coil winding formed on each of said magnetic pole teeth and at least one thin insulating layer positioned between adjacent of the coil windings.

* * * * *